United States Patent
Yokoyama

(10) Patent No.: US 7,086,326 B2
(45) Date of Patent: Aug. 8, 2006

(54) THERMALLY INSULATED POT

(76) Inventor: Katsunori Yokoyama, Yokoyama Co., LTD, 112 Tsugishin Oaza, Tsubameshi, Niigata (JP), 959-1222

( * ) Notice: Subject to any disclaimer, the term of this patent is extended or adjusted under 35 U.S.C. 154(b) by 417 days.

(21) Appl. No.: 10/145,983

(22) Filed: May 14, 2002

(65) Prior Publication Data
US 2002/0185012 A1 Dec. 12, 2002

(30) Foreign Application Priority Data
May 14, 2001 (JP) .......................... 2001-142987

(51) Int. Cl.
A23L 1/00 (2006.01)
A47J 27/00 (2006.01)
A47J 27/06 (2006.01)
A47J 27/08 (2006.01)
A47J 27/10 (2006.01)

(52) U.S. Cl. .............. 99/413; 99/403; 126/369; 126/373.1; 220/573.1; 220/912

(58) Field of Classification Search .............. 99/337, 99/338, 339, 340, 403–418, 401, 444–450; 126/369–369.3, 377.1, 386.1, 384.1, 373.1; 220/592.2, 574.2, 573.1–573.4, 23.87, 23.83, 220/212.5, 592.28, 912
See application file for complete search history.

(56) References Cited

U.S. PATENT DOCUMENTS

| | | | | |
|---|---|---|---|---|
| 3,809,063 A | * | 5/1974 | Hajnal | 99/324 X |
| 4,331,127 A | * | 5/1982 | Grosso | 126/369 X |
| 4,574,776 A | * | 3/1986 | Hidle | 126/369 |
| 4,604,989 A | * | 8/1986 | Kita | 99/413 |
| 5,092,229 A | * | 3/1992 | Chen | 99/337 |
| 5,228,384 A | * | 7/1993 | Kolosowski | 99/342 |
| 5,235,904 A | * | 8/1993 | Ludena | 99/413 |
| 5,287,798 A | * | 2/1994 | Takeda | 99/413 |
| 5,738,238 A | * | 4/1998 | Yang | 220/337 |
| 5,816,139 A | * | 10/1998 | Scorta Paci | 99/413 |
| 5,927,183 A | * | 7/1999 | Lee | 99/337 |
| 6,263,787 B1 | * | 7/2001 | Tseng et al. | 99/413 |
| 6,305,272 B1 | * | 10/2001 | Lin | 99/339 X |

* cited by examiner

Primary Examiner—Timothy F. Simone

(57) ABSTRACT

A thermally insulated cooking pot consists of an outer pot and an inner pot. The inner pot is suspended within the outer pot by hanging from the top inner circumferential area of the outer pot with its own top outer circumferential area. The space between the inner and outer pots becomes an insulation cavity. The contact point between the two pots is sealed by a pliable packing ring with an L-shaped cross-section, thereby sealing the insulation cavity. This sealed insulation cavity provides excellent thermal insulation. The packing ring contains a plurality of protrusions on the surface that come into contact with the inner pot to prevent the packing ring from sticking to the inner pot. The gap formed between the packing ring protrusions and the inner pot prevents the inner pot from sticking to the packing ring.

23 Claims, 13 Drawing Sheets

THERMALLY INSULATED POT

CROSS-REFERENCE TO RELATED APPLICATIONS

Country: Japan

Application Reference Number: 2000-142987

Filing Date: May 14, 2001

FEDERALLY SPONSORED RESEARCH

Not Applicable

SEQUENCE LISTING OR PROGRAM

Not Applicable

BACKGROUND

1. Field of Invention

This invention relates to cooking devices, and particularly, to a thermally insulated pot.

2. Description of Prior Art

Existing thermally insulated cooking devices are double structured, with a sealed insulation cavity between the inner and outer vessels. Having the cavity sealed is a costly process, leading to high manufacturing costs. In addition, pots with sealed insulation cavities are heavy to lift.

Thermally insulated cooking devices without properly sealed insulation cavities, however, would not provide enough thermal insulation, and are therefore impractical. The present invention discovered this.

BRIEF SUMMARY OF THE INVENTION

It is therefore an object of the present invention to address the above problems by providing a cooking pot with an inner pot that is suspended within an outer pot, thereby providing thermal insulation in the space formed between the inner pot and the outer pot.

Another object of the present invention is to provide a tightly sealed insulation cavity that provides excellent thermal insulation.

A further object of the present invention is to provide a cooking pot with thermal insulation that can conveniently function as a conventional cooking pot.

In accordance with the above objects of the present invention, there is provided a cooking device comprising an inner pot that is suspended within an outer pot, forming a single unit. When the inner and outer pots are joined, an insulation cavity is created in the space formed between them. A packing ring is placed between the point of contact of the inner and outer pots in order to seal the insulation cavity. The inner pot is suspended on the inside of the outer pot by having the top outer circumferential area of the inner pot hanging onto the top inner circumferential area of the outer pot. The packing ring, made of a pliable material, blocks air from flowing into and out of the insulation cavity.

In one embodiment, the packing ring has protrusions that come in contact with the top outer circumferential area of the inner pot when the inner pot is suspended within the outer pot. The protrusions on the packing ring prevent the inner pot from making contact with the entire upper surface of the packing ring. Only the packing ring protrusions come in contact with the inner pot.

By having multiple protrusions arranged on the packing ring, a space is created between each protrusion. This space forms a gap when the top outer circumferential area of the inner pot is positioned on the packing ring. This gap will prevent the inner pot from sticking to the packing ring.

The cross section of the packing ring is L-shaped. When the packing ring is positioned in the outer pot, it covers the top, the corner, and the bottom of the step area.

In another embodiment, the packing ring comprises of a metal core partially covered with pliable material. The top part of the metal core is exposed, and the remaining sides are covered with pliable material. The top edges of the packing ring adjacent to the exposed metal core form the protrusions.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

Figure 1:
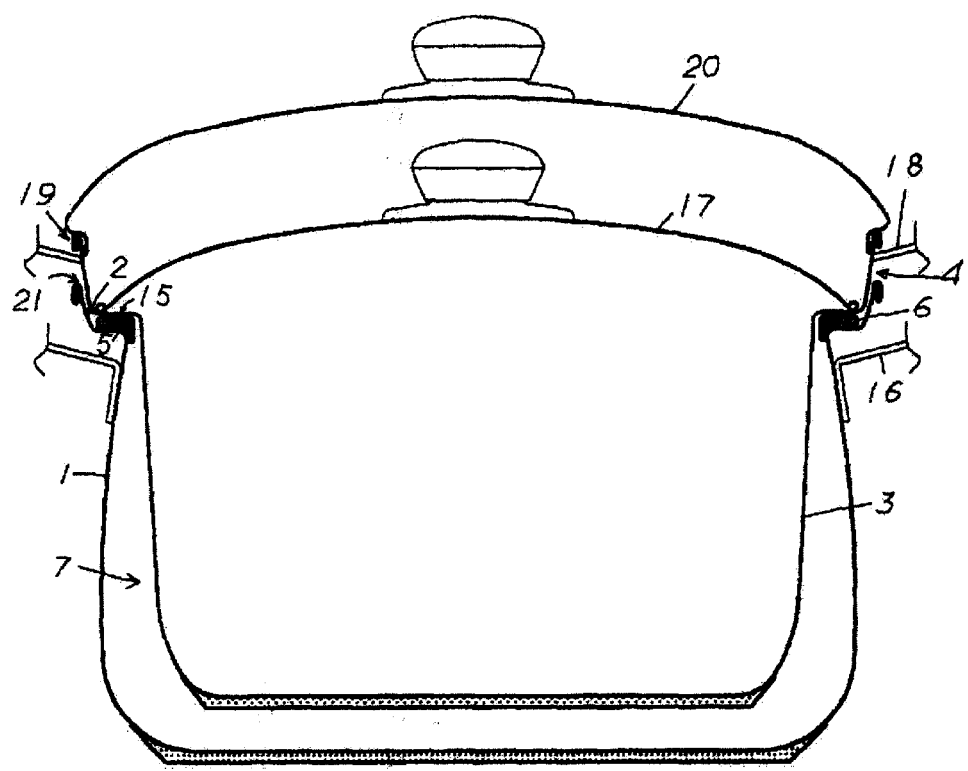
FIG. 1 is a cross-sectional view showing a thermally insulated pot of a first embodiment.

| Reference Numerals In Drawings |
| --- |
| 1 Outer pot |
| 2 Top inner circumferential area of outer pot |
| 3 Inner pot |
| 4 Top outer circumferential area of inner pot |
| 5 Step area of outer pot |
| 6 Packing ring |
| 7 Insulation cavity |
| 8 Upper surface of packing ring |
| 9 Packing ring protrusions |
| 10 Gap |
| 11 Top of step area |

-continued

| Reference Numerals In Drawings |
|---|
| 12 Corner of step area |
| 13 Bottom of step area |
| 14 Core material |
| 15 Step area of inner pot |
| 16 Outer pot handle |
| 17 First pot lid |
| 18 Inner pot handle |
| 19 Inner pot rim |
| 20 Second pot lid |
| 21 Outer pot rim |
| 22 Hollow area |

DETAILED DESCRIPTION OF THE INVENTION

FIGS. 1–9—Preferred Embodiment

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

Reference will now be made in detail to the preferred embodiments of the present invention, examples of which are illustrated in the accompanying drawings.

A cooking apparatus according to a preferred embodiment of the present invention is illustrated in FIGS. 1 to 9. In FIG. 1 an inner pot 3 is suspended within an outer pot 1. The outer pot's 1 inner top circumferential area 2 has a step area 5, where a packing ring 6 is positioned. The packing ring 6, made of a pliable material, supports the inner pot 3 by having a top outer circumferential area 4 of the inner pot 3 hang within the outer pot 1. By having this type of positioning, an insulation cavity 7 is created between a wall and base of the inner pot 3 and a wall and base of the outer pot 1. The packing ring 6 seals the insulation cavity 7 and prevents exterior air from flowing into and out of it.

The present invention, with the packing ring 6 positioned over step area 5, provides excellent thermal insulation when the top outer circumferential area 4 of inner pot 3 is hanging from the step area 5. This is due to the pliability of the packing ring 6, which allows it to create strong adhesion with the step area 5, thereby tightly sealing the insulation cavity 7.

Since this invention provides an easily installed and removed packing ring 6, both the inner pot 3 and outer pot 1 can be used as conventional cooking pots. The simple procedure of installing the packing ring 6 on the step area 5 of the outer pot 1, before suspending the inner pot 3 within the outer pot 1, seals the insulation cavity 7 that is created. In addition, using the pots as conventional cooking pots requires only the removal of the inner pot 3 and the packing ring 6 from the outer pot 1.

The packing ring 6 is made of a pliable material. Therefore, if pliability is increased to make stronger adhesion, there is a possibility that the upper surface 8 of packing ring 6 will stick to the inner pot 3 when the inner pot 3 is raised. To prevent this from happening, the packing ring 6 is arranged with protruded contact areas or protrusions 9 on its upper surface so that the entire upper surface 8 of the packing ring will not come in contact with the inner pot 3 as seen in FIG. 2.

Furthermore, the protrusions 9 will fully support the top outer circumferential area of the inner pot 4. Although a space or gap 10 is created between the protrusions 9, the quality of the seal of the insulation cavity remains highly effective. Consequently, the sticking phenomenon is controlled when the inner pot is removed.

Figure 3:
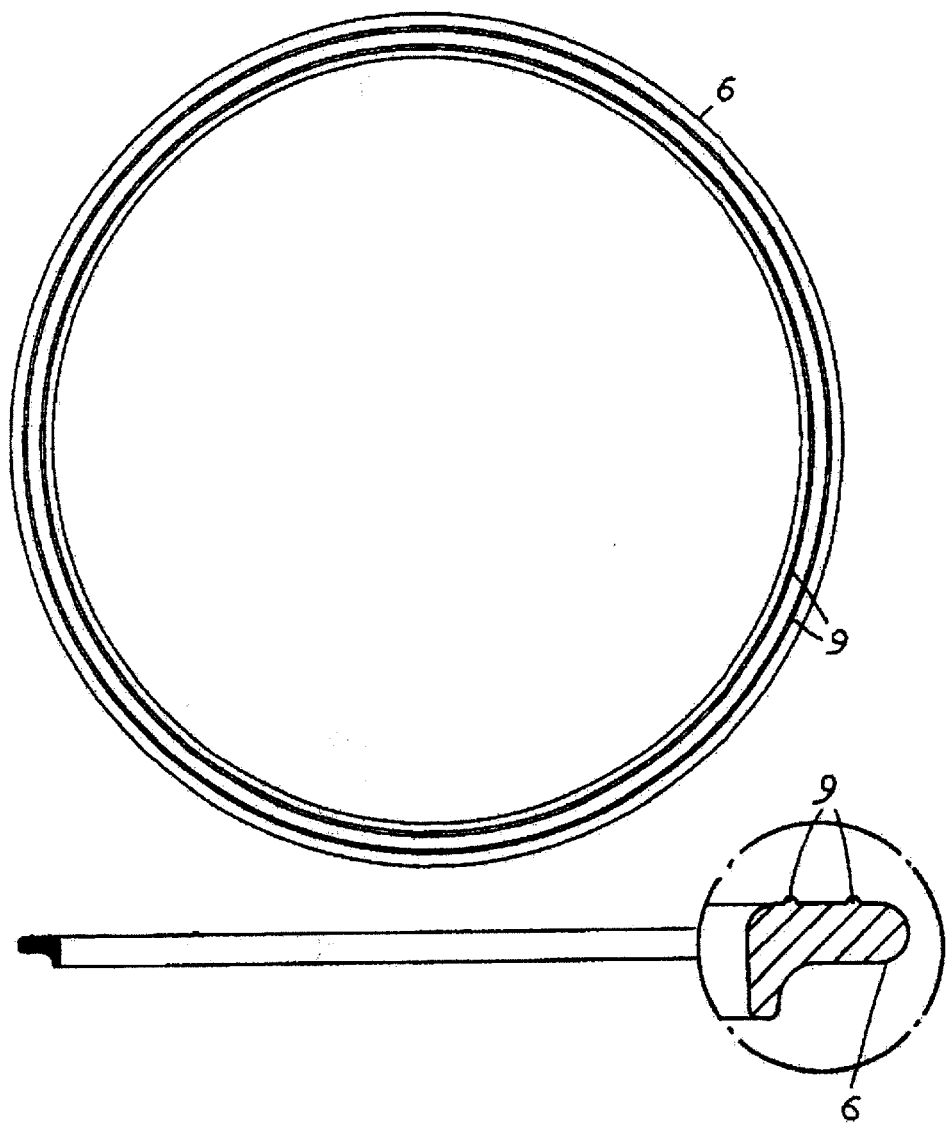
FIG. 3 shows a top view and an exploded sectional view of the ring shaped packing of the first embodiment.

As shown in FIG. 3, the cross section of the packing ring is L-shaped. Having this shape will allow the packing ring 6 to cover all parts of the step area 5 of the outer pot 1 including a top part of step area 11, a corner of step area 12, and a bottom part of step area 13. Consequently, the installation and removal of the packing ring 6 can be done smoothly, without misplacements. At the same time, the tightness of the seal improves, resulting in improved thermal insulation.

Figure 2:
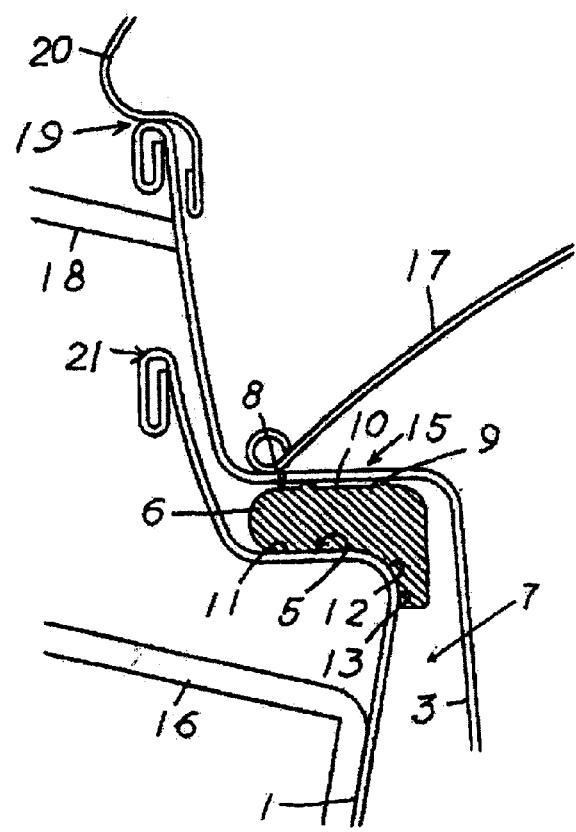
FIG. 2 is a partially cross-sectional view of the essential parts for thermal insulation of the first embodiment.

As shown in FIGS. 1 and 2, an outwardly projecting contact area is formed at the top of the inner circumferential area of the outer pot 2. The step area 5 of the outer pot 1, the base of the outwardly projecting contact area, provides support for the packing ring 6. An outwardly projecting contact area is also formed at the top circumferential area of the inner pot 3. Positioned at the base of the outer pot's outwardly projecting contact area, the packing ring 6 supports a step area 15 of the inner pot 3. By having the outwardly projecting contact area of the inner pot 3 and the outwardly projecting contact area of the outer pot 1 positioned in such a way, a cavity is formed between the wall and base of the inner pot 3 and the wall and base of the outer pot 1. By placing the packing ring 6 between the first step area 5 and the second step area 15, the insulation cavity is tightly sealed.

The step area 5 of the outer pot 1 is sized in a way such that the inner pot 3 can be suspended within the outer pot 1. Specifically, the step area 5 is wide enough to provide a means for the inner pot 3 to be suspended. The wall and base of the inner pot 3 is sized so that the inner pot 3 can be suspended within the outer pot 1 while the step area 15 of the inner pot 3 is shaped and sized so that the step area 5 of the outer pot can support the step area 15 of the inner pot 3.

Figure 4:
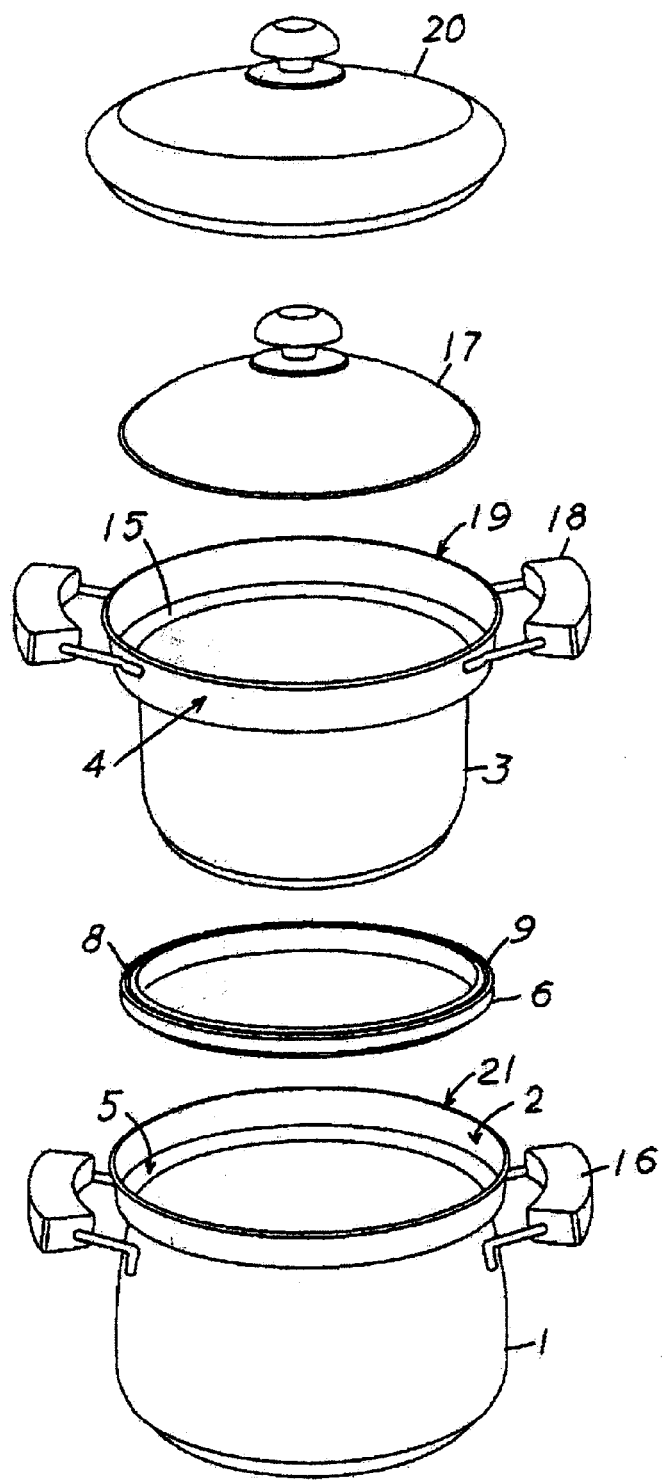
FIG. 4 shows a perspective view of the dismantled cooking apparatus of the first embodiment.
Figure 5:
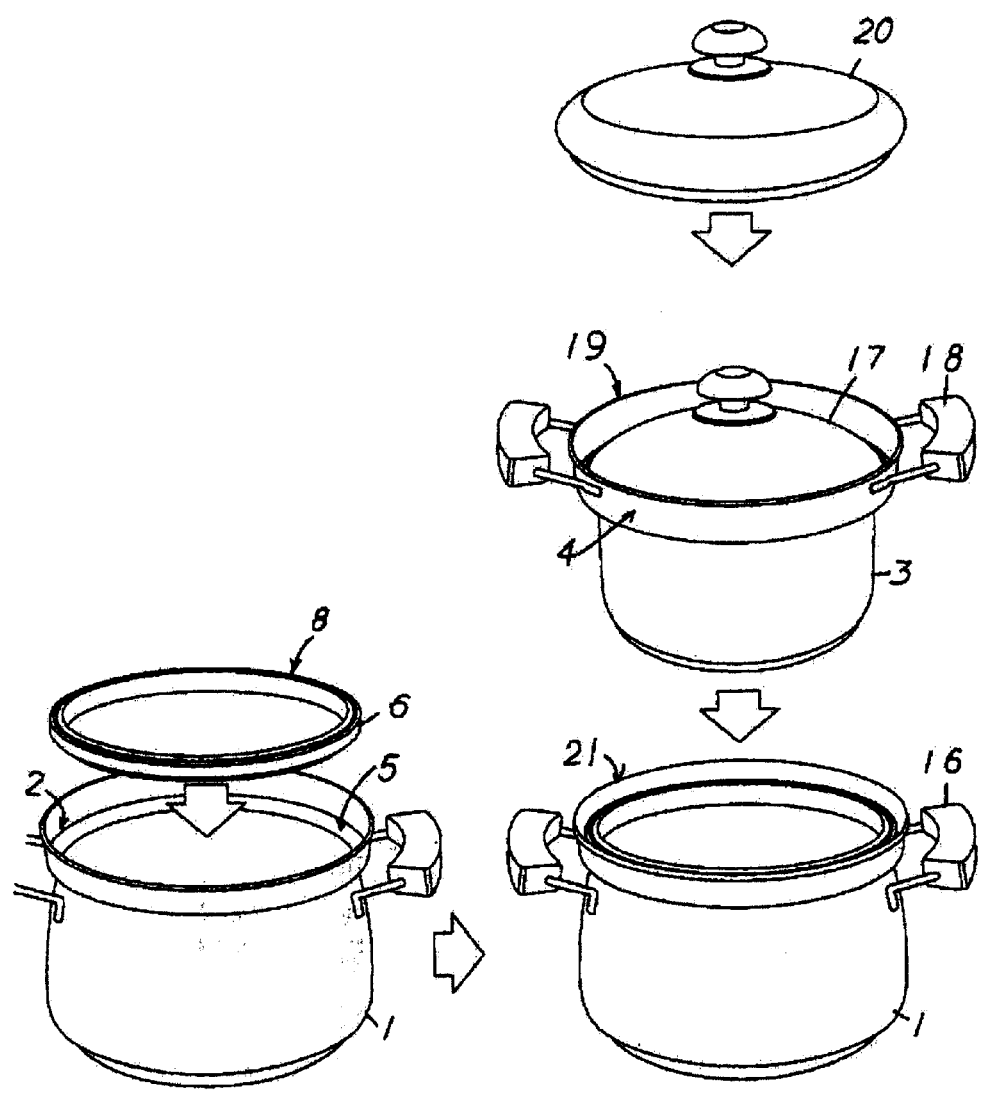
FIG. 5 shows a perspective view of how the pot is assembled according to the first embodiment.
Figure 6:
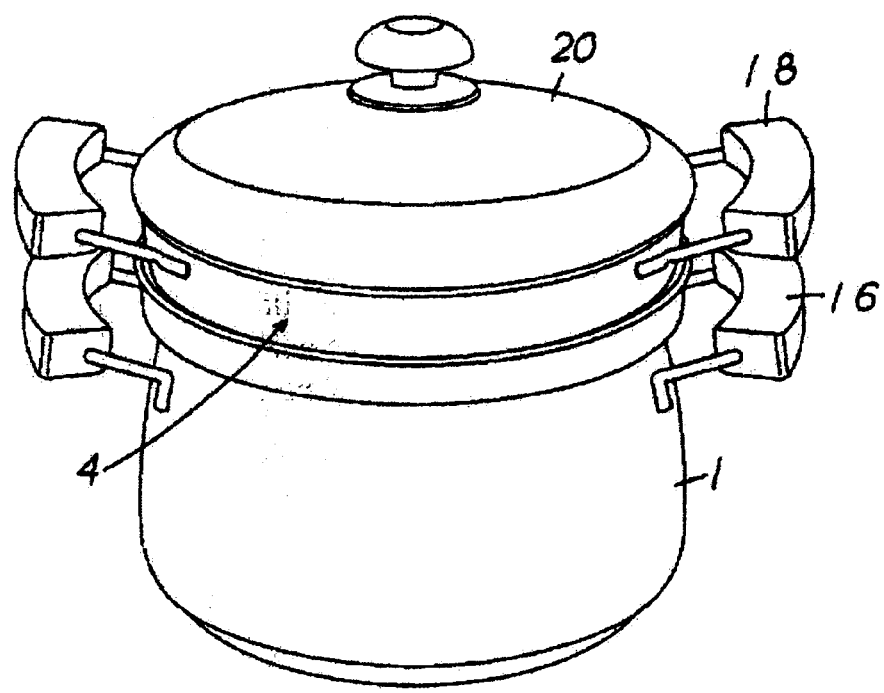
FIG. 6 is a perspective view of the assembled thermal insulating pot.

Two handles 16 are attached to the outer pot 1, and two handles 18 are attached to the top outer circumferential area of the inner pot 3. As shown in FIGS. 1 and 4, a first lid 17 fits on the step area 15 of the inner pot 3. A second lid 20 fits on an inner pot rim 19, making the inner pot 3 double-covered, which provides excellent thermal insulation.

Figure 7:
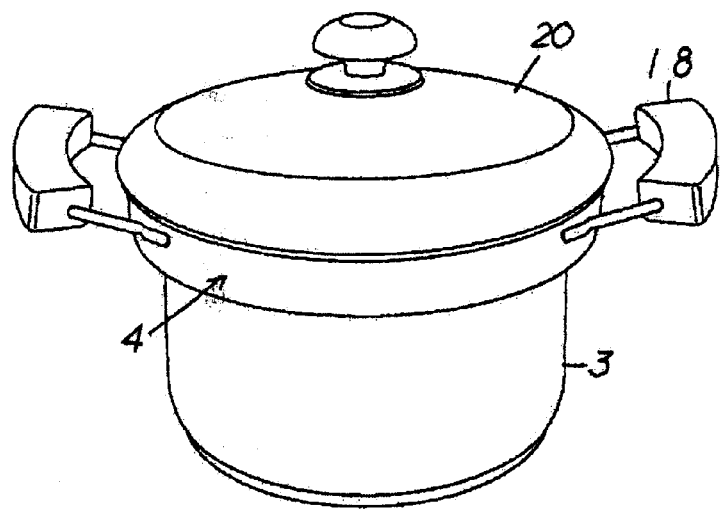
FIG. 7 shows a perspective view of the inner pot with the first lid and outer pot with the second lid, both pots functioning as conventional cooking pots.
Figure 7:
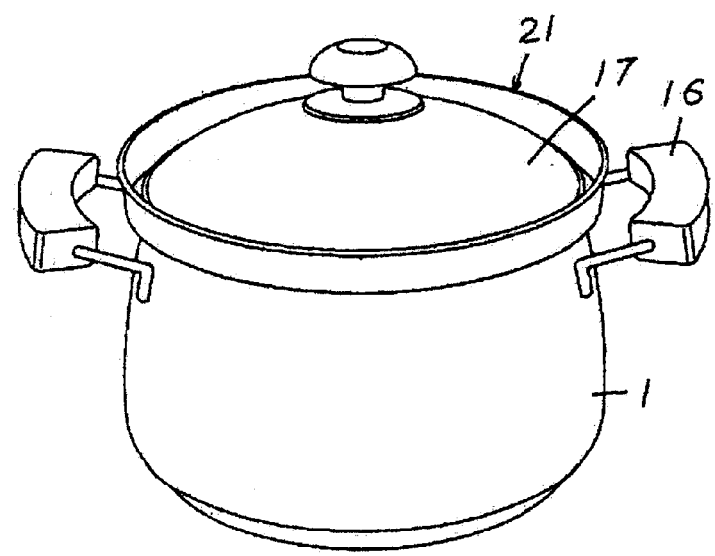
Figure 8:
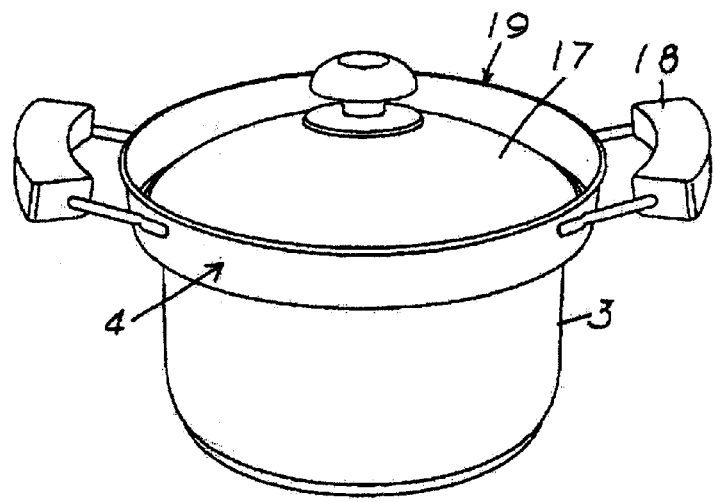
FIG. 8 shows a perspective view of the lids interchanged, the inner pot with the second lid and outer pot with the first lid, both pots functioning as conventional cooking pots.
Figure 8:
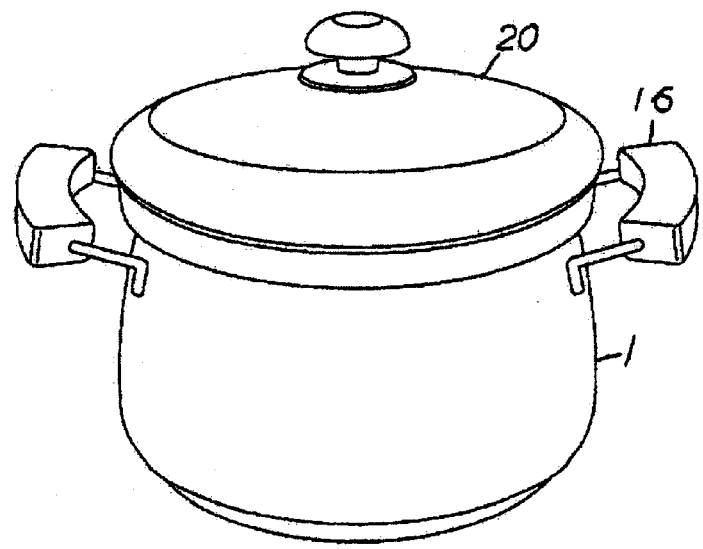
Figure 9:
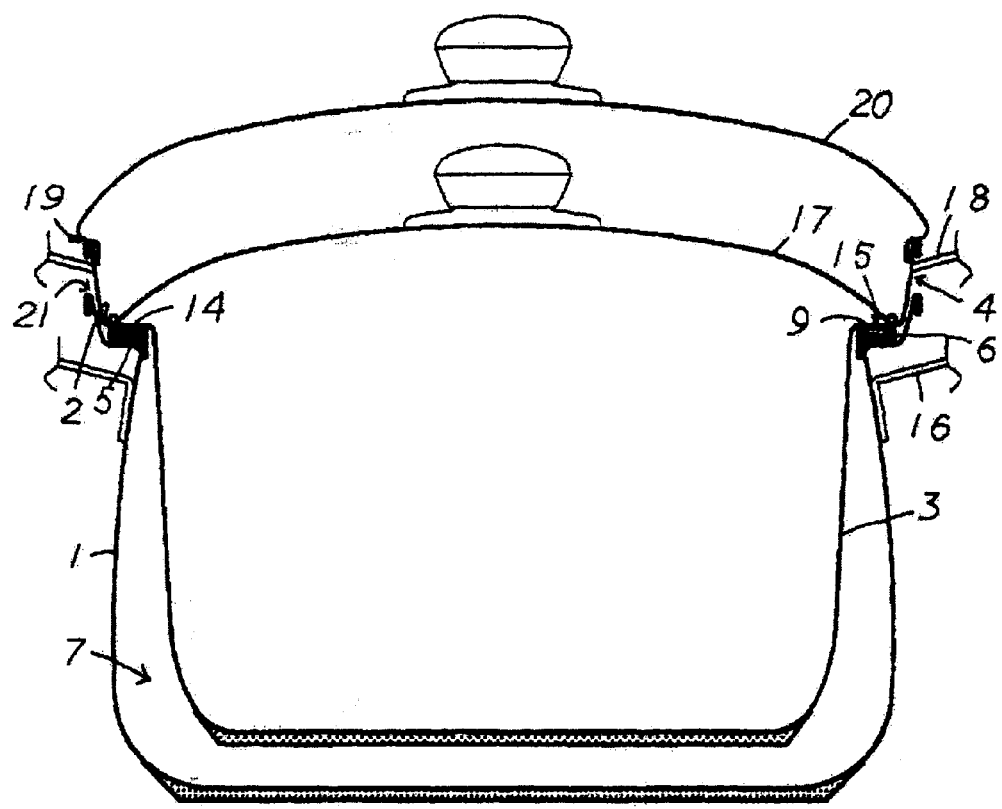
FIG. 9 is a cross-sectional view showing a second embodiment.
Figure 10:
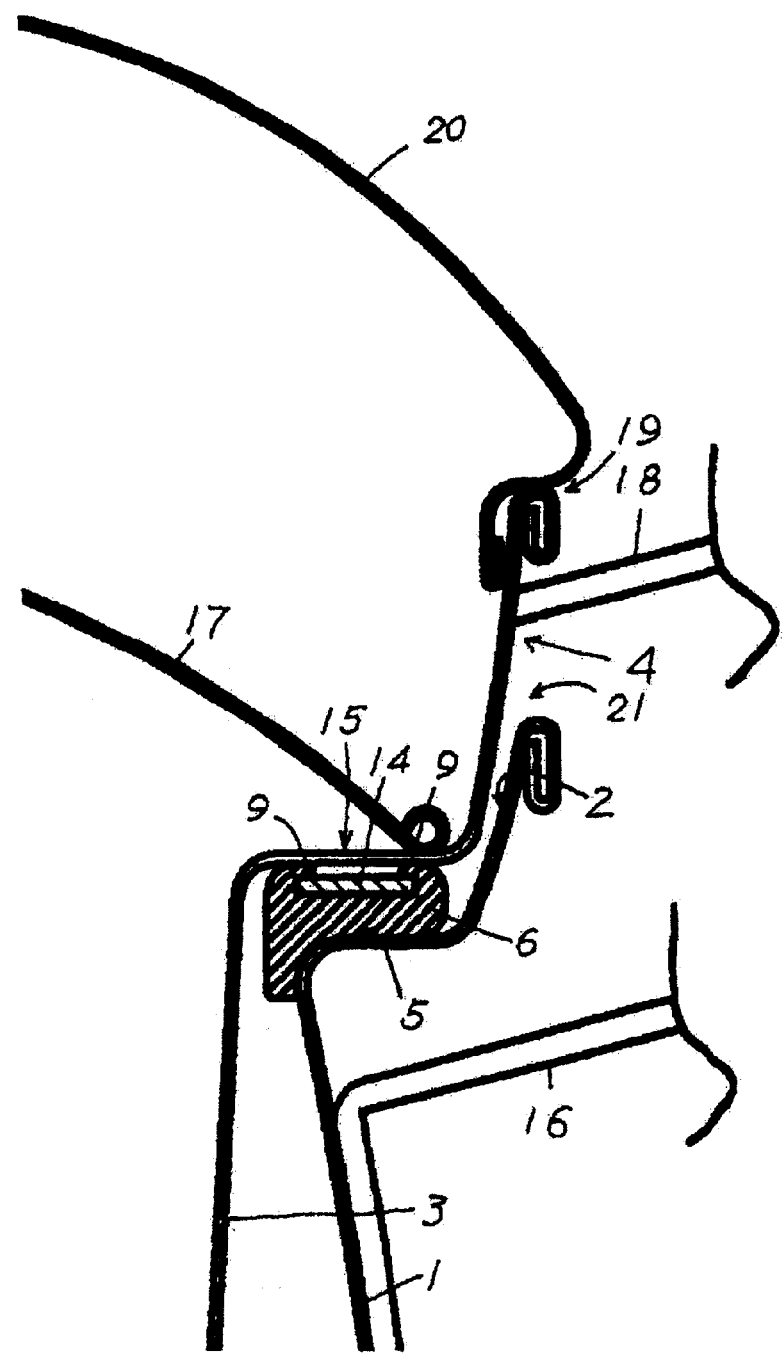
FIG. 10 is a partially cross-sectional view of the important parts for heating of the second embodiment.

As shown in FIGS. 7 and 8, when the inner pot 3 and outer pot 1 are used as conventional pots, both the first lid 17 and the second lid 20 can be used as lids for either the inner pot 3 or the outer pot 1. The first lid 17 can fit either the step area 15 of the inner pot or the step area 5 of the outer pot 3, while the second lid 20 can fit either the inner pot rim 19 or an outer pot rim 21.

As previously mentioned, the packing ring 6 has an L-shaped cross-section, is easily installed and removed, is heat-resistant, and has strong flexibility. These characteristics are attributable to the packing ring 6 being made of silicone rubber having superior adhesive qualities. When the packing ring 6 is installed on the step area 5 of the outer pot 1, it will help seal the insulation cavity 7 and provide excellent thermal insulation. Since the packing ring 6 extends from the outer circumferential surface inwardly to its inner circumferential surface the packing ring 6 will cover all parts of the step area 5 including the top part of step area ii, the corner of step area 12, and the bottom part of step area 13. In other words, the packing ring 6 is properly sized with adequate thickness so that it fully seals the insulation cavity 7, and at the same time, the packing ring 6 is shaped so that its inner vertical circumferential surface does not come in contact with the inner pot 3 as shown in FIG. 2. The packing ring 6 has dual concentrically arranged protrusions 9 on its top surface. By arranging the protrusions 9 in this fashion, the gap 10 that is created when the inner pot 3 is suspended within the outer pot I ensures that the inner pot 3 does not stick to the upper surface 8 of packing ring 6. Each protrusion 9 is sized with enough width so that the packing ring 6 will adequately support the inner pot 3.

Since the purpose of the packing ring 6 is to close the insulation cavity 7 and tightly seal it, it is made of pliable material, which does not help to maintain its shape. Protrusions 9, in contrast, help the packing ring 6 maintain its shape. When the packing ring 6 keeps its shape, its installation onto the step area 5 of the outer pot 1 is simple and smooth.

FIGS. 9–13—Additional Embodiment

An additional embodiment of the present invention is illustrated in FIGS. 9 to 13. In this embodiment, the packing ring 6 is made with a core material 14 made of metal. The core material 14 is covered by pliable material on all sides except at the top. The core material 14 helps the packing ring 6 to maintain its shape while the pliable material helps it to have adhesive qualities.

Figure 11:
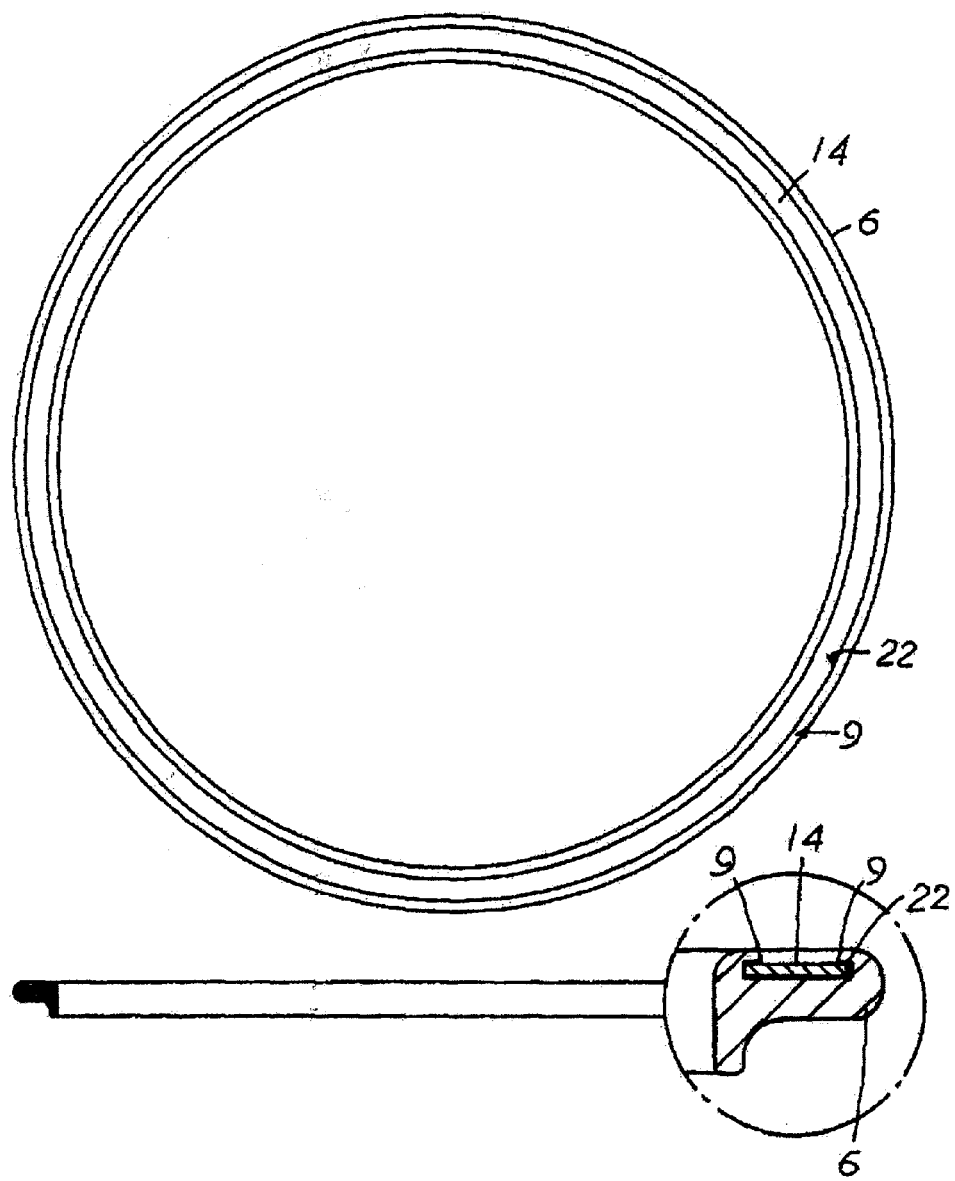
FIG. 11 shows a top view and an exploded sectional view of the ring shaped packing of the first embodiment.
Figure 12:
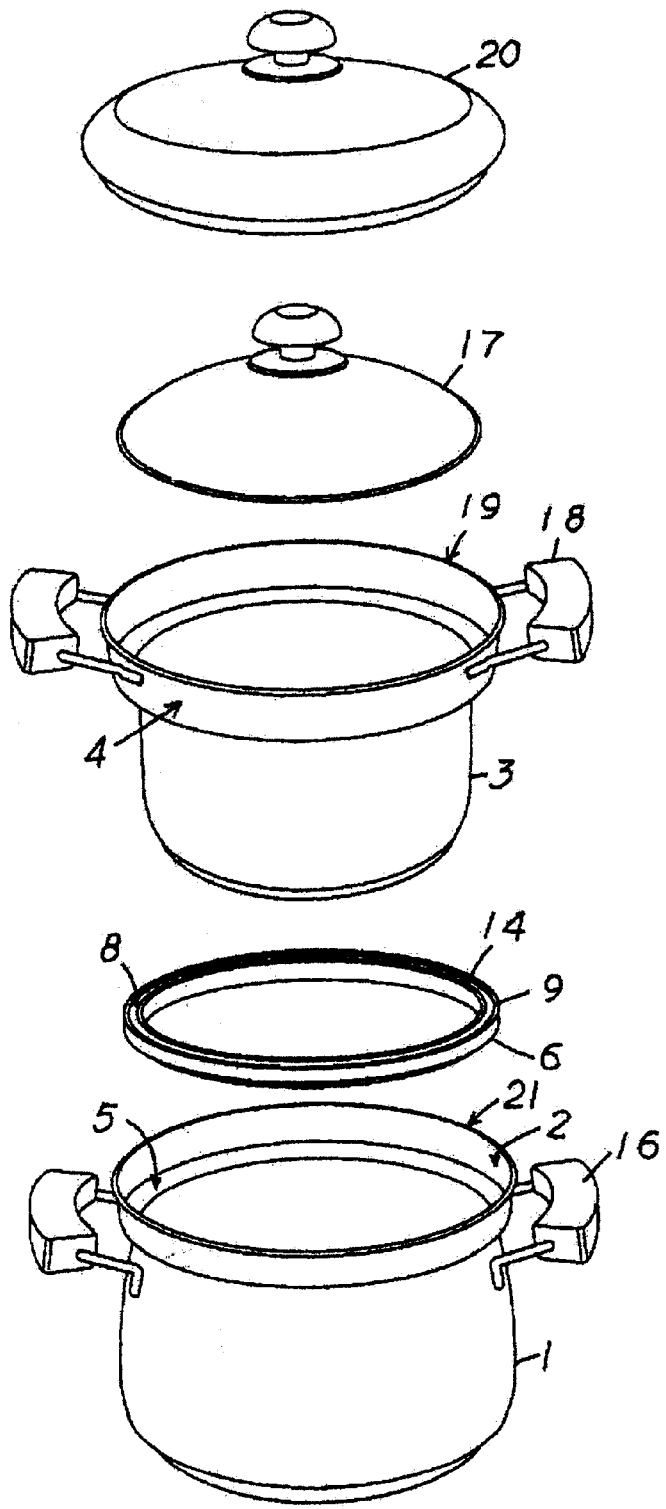
FIG. 12 shows a perspective view of the second embodiment.
Figure 13:
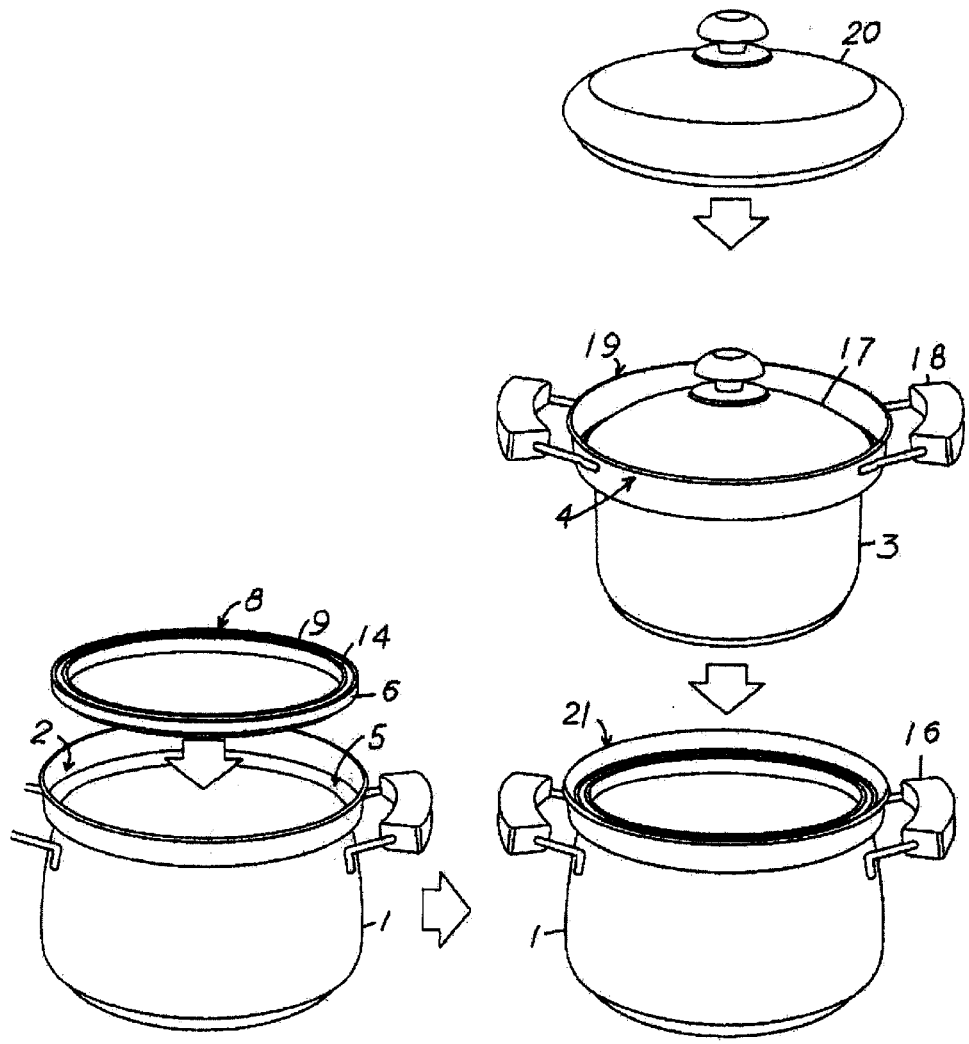
FIG. 13 shows a perspective view of how the pot is assembled according to the second embodiment.

As shown in FIG. 11, the packing ring 6 has a hollow area 22, and on top of the hollow area 22 is where the protrusions 9 are formed. The core material, a plate-like metal made of stainless steel, occupies the hollow area 22 of the packing ring. The top part of the core material 14 is exposed, and the exposed area will have protrusions 9 above either end. Having this composition makes the packing ring 6 easier to install.

If too much pressure from the weight of the inner pot 3 and its contents is exerted on the protrusions 9, causing the protrusions 9 to be deformed, then the inner pot 3 and the upper surface 8 of packing ring 6 will stick to each other, and the sealed insulation cavity 7 will make it difficult for the inner pot 3 to be separated from the outer pot I. However, when the protrusions 9 are deformed due to pressure, the gap 10 will still be there to prevent the upper surface 8 of packing ring 6 from sticking to the inner pot 3. Even if the protrusions 9 are completely crushed and the inner pot 3 comes into contact with the exposed core material 14, a metallic ring-shaped core, the design and composition of the packing ring 6 will prevent the inner pot 3 from sticking to the upper surface 8 of packing ring 6. When the inner pot 3 comes in contact with the metal core, they will not stick to each other because metals do not stick to each other.

The packing ring 6 is made of pliable material to help it have adhesive qualities when in contact with the inner pot 3 and outer pot 1. The flexibility of the material determines the level of adhesion. The more flexible the material is, the higher the level of adhesion. The pliability of the packing ring 6 also allows the protrusions 9 to flex and be adaptable in order to provide for a good fit for the top outer circumferential area of the inner pot 4. This, in turn, improves the tightness of the seal of the insulation cavity 7. Therefore, even when the inner pot 3 contains little food, the seal of the insulation cavity will still be tight enough because the inner pot 3 will hang effectively on the packing ring 6 in order to provide excellent thermal insulation.

On the other hand, the packing ring 6 may be difficult to install on the step area 5 of the outer pot 1 if the material of the packing ring 6 is too flexible and easily bent. This can be the case even if the packing ring 6 is able to maintain its essential shape.

In this embodiment, as in the first embodiment, the packing ring 6 is arranged with protrusions 9 for support. Since this helps the packing ring 6 to keep its shape, a softer material can be used for the packing ring 6, which makes it easier to install. In the second embodiment, the packing ring 6 consists of a metallic ring-shaped core material 14. This improves its shape retaining qualities, which also makes the packing ring 6 easier to install.

Therefore, when the packing ring 6 is made of a very flexible material to ensure that the insulation cavity 7 is well sealed, it can still maintain its shape as well as be easily installed. This proves the usefulness of the packing ring 6.

The packing ring 6 of the second embodiment, with a metallic ring-shaped core, does not necessarily have to be made with stainless steel as long as it can keep its shape. The core material 14 does not have to be board-shaped having wide width. For example, the core material 14 can have line-form with narrower width such as a wire or a group of wires. In addition, the configuration of the core material 14 may be setup more than once.

The present invention does not only apply to the embodiments mentioned here. The requirements for each specific construction could be designed so that it suits what it is asked for.

Conclusion, Ramifications, and Scope

Accordingly, the reader will see that the thermally insulated cooking pot has excellent thermal insulating qualities. The thermally insulated cooking pot can be easily installed by placing the packing ring on the step of the outer pot and by suspending the inner pot within the outer pot. The pliability of the packing ring ensures that the top outer circumferential area of the inner pot can securely hang from the top inner circumferential area of the outer pot. The pliability of the packing ring also ensures that the packing ring adheres to the inner and outer pots, thereby tightly sealing the insulation cavity to provide excellent thermal insulation.

The packing ring's pliability and shape allows the packing ring to be easily installed and removed. By simply positioning the packing ring on the steps of the outer pot and by positioning the inner pot on the packing ring, a thermally insulated pot with excellent heat retention is possible. By simply removing the inner pot and packing ring from the outer pot, the inner and outer pots both can be used as conventional pots.

The thermally insulated pot of this invention provides excellent thermal insulation because the packing ring protrusions make possible an insulation cavity that is securely sealed. The gaps, formed between the packing ring protrusions and the inner pot, prevent the inner pot from sticking to the packing ring.

The packing ring adequately covers the top, the corner, and the bottom of the step area to ensure that the insulation cavity is completely sealed, allowing for exceptional heat insulating qualities. The packing ring can be installed smoothly, which makes installation easy.

The packing ring can be made with a metal core material. Not only does this help the packing ring to maintain its shape, but also makes it easier to install the packing ring on the step area of the outer pot.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Thus the scope of the invention should be determined by the appended claims and their legal equivalents, rather than by the examples given.

What is claimed is:

1. A cooking apparatus, comprising:
   an outer pot having a wall and a base, said outer pot having a top inner circumferential area;
   an inner pot having a wall and a base, said inner pot having a top outer circumferential area, said inner pot's circumferential area, or step, is hanging onto said outer pot's top inner circumferential area, thereby forming a single unit;
   said inner pot is in a state of suspension in the outer pot;
   a removable packing ring made of pliable material is positioned between contact areas of said inner pot and said outer pot;
   and a heat insulating cavity is formed between said inner pot and said outer pot,
   whereby said packing ring seals said heat insulating cavity by preventing exterior air from flowing in and out of said heating insulating cavity.

2. The cooking apparatus as defined in claim 1, wherein said inner pot hangs from a step area of said outer pot, making contact with protrusions on said packing ring, not with the complete upper surface of said packing ring.

3. The cooking apparatus as defined in claim 2, wherein a plurality of protrusions arranged on said packing ring creates a gap between said protrusions, whereby said inner pot is prevented from sticking to said packing ring.

4. The cooking apparatus as defined in claim 3, wherein said packing ring having its cross section L-shaped is positioned over an upper part, a corner, and a bottom part of the top inner circumferential area of said outer pot.

5. The cooking apparatus as defined in claim 4, wherein said packing ring further comprises a metal core covered by pliable material except at the top and arranged with a plurality of protrusions.

6. The cooking apparatus as defined in claim 3, wherein said packing ring further comprises a metal core covered by pliable material except at the top and arranged with a plurality of protrusions.

7. The cooking apparatus as defined in claim 2, wherein said packing ring having its cross section L-shaped is positioned over an upper part, a corner, and a bottom part of the top inner circumferential area of said outer pot.

8. The cooking apparatus as defined in claim 7, wherein said packing ring further comprises a metal core covered by pliable material except at the top and arranged with a plurality of protrusions.

9. The cooking apparatus as defined in claim 2, wherein said packing ring further comprises a metal core covered by pliable material except at the top and arranged with a plurality of protrusions.

10. The cooking apparatus as defined in claim 1, wherein said packing ring having its cross section L-shaped is positioned over an upper part, a corner, and a bottom part of the top inner circumferential area of said outer pot.

11. The cooking apparatus as defined in claim 10, wherein said packing ring further comprises a metal core covered by pliable material except at the top and arranged with a plurality of protrusions.

12. The cooking apparatus as defined in claim 1, wherein said packing ring further comprises a metal core covered by pliable material except at the top and arranged with a plurality of protrusions.

13. A cooking apparatus, comprising:
   an outer pot having a wall and a base, said outer pot having a top inner circumferential area;
   an inner pot having a wall and a base, said inner pot having a top outer circumferential area, said inner pot's circumferential area, or step, is hanging from a step area of said outer pot's top inner circumferential area, thereby forming a single unit;
   said step areas makes contact with protrusions on said packing ring, not with the complete upper surface of said packing ring,
   said inner pot is in a state of suspension in the outer pot;
   a removable packing ring made of pliable material is positioned between contact areas of said inner pot and said outer pot;
   and a heat insulating cavity is formed between said inner pot and said outer pot,
   whereby said packing ring seals said heat insulating cavity by preventing exterior air from flowing in and out of said heating insulating cavity.

14. The cooking apparatus as defined in claim 13, wherein a plurality of protrusions arranged on said packing ring creates a gap between said protrusions, whereby said inner pot is prevented from sticking to said packing ring.

15. The cooking apparatus as defined in claim 14, wherein said packing ring having its cross section L-shaped is positioned over an upper part, a corner, and a bottom part of the top inner circumferential area of said outer pot.

16. The cooking apparatus as defined in claim 15, wherein said packing ring further comprises a metal core covered by pliable material except at the top and arranged with a plurality of protrusions.

17. The cooking apparatus as defined in claim 14, wherein said packing ring further comprises a metal core covered by pliable material except at the top and arranged with a plurality of protrusions.

18. The cooking apparatus as defined in claim 13, wherein said packing ring having its cross section L-shaped is positioned over an upper part, a corner, and a bottom part of the top inner circumferential area of said outer pot.

19. The cooking apparatus as defined in claim 18, wherein said packing ring further comprises a metal core covered by pliable material except at the top and arranged with a plurality of protrusions.

20. The cooking apparatus as defined in claim 13, wherein said packing ring further comprises a metal core covered by pliable material except at the top and arranged with a plurality of protrusions.

21. The cooking apparatus as defined in claim 13, wherein said packing ring having its cross section L-shaped is positioned over an upper part, a corner, and a bottom part of the top inner circumferential area of said outer pot.

22. The cooking apparatus as defined in claim 21, wherein said packing ring further comprises a metal core covered by pliable material except at the top and arranged with a plurality of protrusions.

23. The cooking apparatus as defined in claim 13, wherein said packing ring further comprises a metal core covered by pliable material except at the top and arranged with a plurality of protrusions.

* * * * *